US012649157B2

(12) United States Patent
Bihn

(10) Patent No.: US 12,649,157 B2
(45) Date of Patent: Jun. 9, 2026

(54) METHOD OF CRUSHING AND PROCESSING GRAIN WITHOUT DESTROYING GERM POUCHES IN THE GRAIN

(71) Applicant: Christopher Bihn, Fort Recovery, OH (US)

(72) Inventor: Christopher Bihn, Fort Recovery, OH (US)

( * ) Notice: Subject to any disclaimer, the term of this patent is extended or adjusted under 35 U.S.C. 154(b) by 289 days.

(21) Appl. No.: 18/586,091

(22) Filed: Feb. 23, 2024

(65) Prior Publication Data

US 2024/0390911 A1 Nov. 28, 2024

Related U.S. Application Data

(60) Provisional application No. 63/468,138, filed on May 22, 2023.

(51) Int. Cl.

| | |
|---|---|
| ***B02C 4/08*** | (2006.01) |
| ***B02C 4/06*** | (2006.01) |
| ***B02C 4/28*** | (2006.01) |
| ***B02C 4/30*** | (2006.01) |
| ***B02C 4/42*** | (2006.01) |
| *B02C 4/38* | (2006.01) |

(52) U.S. Cl.

CPC .................. *B02C 4/08* (2013.01); *B02C 4/06* (2013.01); *B02C 4/286* (2013.01); *B02C 4/30* (2013.01); *B02C 4/42* (2013.01); *B02C 4/38* (2013.01)

(58) Field of Classification Search

CPC .............. B02C 4/06; B02C 4/08; B02C 4/286
See application file for complete search history.

(56) References Cited

U.S. PATENT DOCUMENTS 3,208,677 A 9/1965 Hesse
3,282,199 A * 11/1966 Mason ...................... B02C 4/06 100/90
5,174,511 A * 12/1992 Ruegger ................. B02C 4/286 241/34

(Continued)

FOREIGN PATENT DOCUMENTS

CH 689823 A5 * 12/1999 ............. B02C 23/34

OTHER PUBLICATIONS

SUC Suction Blowing Systems, Kongskilde Industries, https://kongskilde-industries.com/industrial/product/suc-suction-blowing-systems/, 6 pages.

*Primary Examiner* — Jared O Brown
(74) *Attorney, Agent, or Firm* — David R. Heckadon; Gordon Rees Scully Mansukhani LLP

(57) ABSTRACT

A system of crushing and processing grain without destroying germ pouches in the grain by: (a) pneumatically transporting grain from truck to a cyclone and processing bin to a pre-crushing area; (b) dropping the grain from the pre-crushing area down into a single pass crushing machine while simultaneously releasing air from the pre-crushing area such that the grain falls from the pre-crushing area into a single-pass crushing machine under the force of gravity and is not blown down into the single-pass crushing machine; and then (c) crushing the grain in the single-pass crushing machine that has three or more roller pairs such that from one successive roller pair down to the next roller pair the grain is crushed smaller and smaller when moving downwardly in the machine. Also included are air locks with attached dust sleeves.

21 Claims, 11 Drawing Sheets

(56) References Cited

U.S. PATENT DOCUMENTS

| | | | | |
|---|---|---|---|---|
| 5,544,823 | A * | 8/1996 | Baltensperger | B02C 9/04 241/11 |
| 8,851,408 | B2 | 10/2014 | Bihn | |
| 9,808,106 | B1 | 11/2017 | Bihn | |
| 9,844,783 | B2 | 12/2017 | Bihn | |
| 2009/0294558 | A1 | 12/2009 | Bihn | |
| 2010/0187339 | A1 * | 7/2010 | Kannar | A23G 1/06 241/38 |
| 2015/0028139 | A1 * | 1/2015 | Bihn | B02C 4/08 241/9 |
| 2019/0381509 | A1 * | 12/2019 | Stroitelev | B02C 4/28 |
| 2021/0187513 | A1 * | 6/2021 | Hoehn | B02C 4/02 |
| 2025/0360511 | A1 * | 11/2025 | Adams | B02B 1/06 |

* cited by examiner

METHOD OF CRUSHING AND PROCESSING GRAIN WITHOUT DESTROYING GERM POUCHES IN THE GRAIN

RELATED APPLICATION

The present application claims priority to U.S. Provisional Patent Application Ser. No. 63/468,138, filed May 22, 2023, of same title, the entire disclosure of which is incorporated herein by reference in its entirety for all purposes.

TECHNICAL FIELD

The present system relates to grain processing.

BACKGROUND OF THE INVENTION

A mechanical device for gently crushing grain that does not destroy the germ pouch was described in U.S. Pat. No. 8,851,408 (the '408 patent) to John Bihn of Fort Recovery, Ohio. A system for processing the various grains using the mechanical device in a manner that does not destroy their germ pouches is described in U.S. Pat. No. 9,844,783 (the '783 patent) to John Bihn of Fort Recovery, Ohio. In contrast to the patented John Bihn mechanical device and system, the standard practice in the industry today is to simply grind the grains. Unfortunately, this results in the destruction of the germ pouches, which in turn results in, among other things, the need for more preservatives after processing and loss of nutrients. Processing grain in a manner that does not destroy the germ pouches is therefore preferred to preserve the benefits outlined in the '783 patent.

Although the Bihn mechanical device in the '408 patent successfully gently crushes the grain, the mechanical device as patented suffers from the disadvantage of low throughput and lack of commercial application since the grains must first be brought to the crusher by hand loading without their germ pouches already being damaged. Moreover, the mechanical device in the '408 patent suffered from the inefficiency of often requiring multiple passes of the grain through the machine to gently crush the grain and the design of the machines and rollers in the '408 patent caused a lack of precision during the crushing process regarding preservation of the germ pouches.

Another disadvantage of the '783 patent is that it currently contemplates that the grain be placed in a long-term storage elevator or a grain lot that may not preserve the germ pouches. The '783 patent also contemplates transferring the grain from the long-term storage elevator or a grain lot to the crushing machinery. This was typically done by hand loading small quantities of grain at a time. It would instead be desirable to have a long term storage system that is climate controlled to preserve the germ pouches.

Another disadvantage of the '783 patent is that it describes controlling the moisture content of the grain as a "secondary process" which is done after the grain has been crushed. It would instead be desirable to control the moisture content of the grain before it is crushed.

Furthermore, the '783 patent described a system for processing the gently crushed grain that suffers from inefficiency from lack of methodology for preserving the germ pouches through the process and also did not have sufficient efficiencies to make the machine and process commercially viable while maintaining the integrity of the germ pouches and assuring the product is FDA compliant.

Therefore, a system is desired for increasing the efficiencies of the patented Bihn machine in the '408 patent and the system described in the '783 patent. Any commercially viable system must also prevent damage to the grain's germ pouches which can be difficult when processing grains in bulk. Unfortunately, existing systems for transporting grains on an industrial scale typically involve auger systems, which can do damage to the germ pouches in the grain.

Therefore, what is desired is a system for loading grain into one or more crushing machines that does not rely on augers to move the grain. In addition, preventing the grains from overheating during processing and storage has always been somewhat problematic. Moreover, the moisture content of the grain must also be controlled. In short, it would instead be desirable to provide a more efficient machine and system that increases the throughput of the patented Bihn machine and system (i.e.: is able to deliver larger amounts of grains into one or more crushers), yet is also able to achieve this while also keeping the grains cool both during and after the processing and while also preserving the germ pouch. Ideally as well, any long term storage of the grains prior to crushing should be climate controlled. Instead, it would be more desirable to crush and then store the grains.

It is also desirable to optimize the shape of the crushing rollers themselves and the manner in which they are housed in the crushing machines such that they do not cut through the germ pouch of the grains as they are crushed and to optimize the separation of the starch from the grain.

As will be shown, the present machine and system builds upon the patented Bihn machine and Bihn systems as described in the '408 and '783 patents, and provides new, novel and non-obvious techniques and systems for increasing the production efficiencies of the patented Bihn machinery and system. As will also be shown, the present improved machine is more efficient and the present system transports grain in industrial sized quantities into the grain crushing improved machine while still preventing damage to the grain germ pouches by avoiding overheating of the grain, while also controlling moisture so that the grain has the germ pouch preserved. In addition, the present system provides a novel shape to the crushing rollers themselves and the manner in which such rollers are housed and operate within the crushing machine such that damage to the germ pouches is minimized or completely avoided and separation of the starch from the grain is optimized.

SUMMARY OF THE INVENTION

In preferred aspects, the present system provides a method of crushing and processing grain without destroying germ pouches in the grain. This method preferably comprises: (a) pneumatically transporting grain from a truck in a receiving area to a temperature and moisture controlled cyclone and processing bin; (b) pneumatically transporting the grain from the cyclone and processing bin to a pre-crushing area; (c) dropping the grain from a second cyclone in the pre-crushing area down into a single-pass crushing machine while simultaneously releasing air from the second cyclone in the pre-crushing area thereby dropping air pressure in the pre-crushing area; and then (d) crushing the grain in the single-pass crushing machine.

In preferred aspects, the single-pass grain crushing machine comprises three or more, and optionally up to six to ten different sized roller pairs having intermeshed teeth, with each of the different sized roller pairs having a different teeth geometry such that the grains are crushed finer and finer as they pass downwards from one roller pair to the next.

In preferred aspects, the roller pairs are secured in the crushing machine using inserts or housings that have self-aligning bearings. The advantage of such self-aligning bearings is that they hold the roller shafts on center, thereby allowing the rollers to operate at high speeds with precision, preserving the germ pouch during the crushing process. Preferably, each roller in the roller pair has its own insert or housing.

Also in preferred aspects, each of the roller pairs preferably turns at different speeds from the other roller pairs. Optionally, the speeds of the rollers can be varied for different crushing applications. Advantageously, such roller pairs preferably do not require hand adjustment on the machine once the crushing machine has been produced from the manufacturer specifications. In other words, the separation distances between the roller pairs do not need to be adjusted. In accordance with the present system, the grain falls down from the pre-crushing area into the single-pass crushing machine under the force of gravity and is not blown down into the single-pass crushing machine. This “falling” vs. “blowing” system of loading the present single-pass crushing machine advantageously prevents damage to the germ pouches.

In preferred aspects, the grain is pneumatically transported from the truck to the temperature and moisture controlled cyclone and processing bin housed in a temperature and moisture controlled setting by a first blower system. This first blower system may optionally be a Kongskilde™ Suction Blowing System, however, it is to be understood that the present system is not limited to only this type of blower system and instead may use any other suitable suction and blowing systems and machinery, all keeping within the scope of the present invention. The grain is then pneumatically transported from the cyclone and processing bin to a second cyclone in the pre-crushing area by a second blower system. Once again, any form of suction and blowing system can be used for the second blower system, all keeping within the scope of the present invention.

In preferred aspects, the cyclone and processing bin is insulated to prevent heating of the grain received therein. Heating of the grain is to be avoided since it can destroy the grain pouches and promote growth of pests and contamination. As the present processing bin may be located outdoors, its insulation is particularly effective in keeping the grain cool on hot or sunny days. In additional embodiments, the cyclone and processing bin may have legs thereon such that the grain is elevated above the ground such that air can pass under the cyclone and processing bin to provide cooling. The cyclone and processing bin is designed such that a fan is inserted into the side of the cyclone and processing bin to blow air into the cyclone and processing bin to thereby control moisture. The cyclone and processing bin may also be kept in an air conditioned or dehumidified room or in a sun-shielding building structure. In preferred embodiments, the grain is blown into the side of the cyclone and processing bin by the first blower system and removed through a funnel at the bottom of the processing bin by the second blower system. In preferred aspects, the grain is blown into the processing bin such that with the fan inserted into the side of the cyclone a “cyclone” is formed with the grain swirling around several times in the bin before descending. Simultaneously, air is permitted to escape from the top of the processing bin. This system controls moisture and temperature of the grains and preserves the germ pouch in the processing.

The present system uses pneumatic transportation of the grains (i.e.: both suction and blowing of the grains), yet is designed such that it does not blow the grains down into the crushing machine. Instead, by allowing the grains to simply fall down into the crusher from the second cyclone and pre-crushing area above the crusher, the present system advantageously does not damage the germ pouches in the grains and allows industrial and commercial quantities to be processed without damaging the germ pouches.

Since the present grain processing system relies on pneumatic transportation of the grain, the present system includes a uniquely designed system for reducing pressures in the pre-crushing area that is preferably positioned directly above the grain crushing machine. In preferred aspects, this uniquely design air pressure reduction system involves a second cyclone at a first airlock (which reduces the air pressure to a first degree) and a second airlock (through which the air pressure is reduced by a second amount). In preferred aspects, releasing air from the second cyclone and pre-crushing area through the first or second airlock comprises sending air out and into a series of dust sleeves. These dust sleeves have pores therein such that air passing into the dust sleeves escapes through the pores, but the dust received into the dust sleeves is trapped in the dust sleeves and not released to the atmosphere. The advantage of this novel design approach is that the air that is used to pneumatically transport the grain is cleaned such that grain dust is not simply expelled to the atmosphere at the end of the grain transportation process. The present inventor has experimentally determined that further air pressure drops in the grain in the second cyclone in the pre-crushing area above the crushing machine is desired. Therefore, in accordance with the present system, a second air venting pathway is provided with the air venting out of the second airlock into a dust sleeve. Preferably, this second airlock is positioned directly above the grain crushing machine, and may preferably be in the same room as the grain crushing machine.

In various preferred aspects, the single-pass crushing machine may have more than three pairs of rollers, four to six pairs of rollers or six to ten pairs of rollers with the grain falling downward from one roller pair to the next. Successive roller pairs have differently shaped teeth, effectively changing the separation of distances between the intermeshed teeth. This is done by changing of the size and angle of the teeth from one roller pair to the next, with the circumference of the rollers being the same in each machine and with the space between the centers of the rollers being the same in each machine. As a result of varying the teeth geometries, the grain can be finely crushed to a desired size.

In further optional aspects, the present method includes freezing the grain after the grain has exited the multi-pass crushing machine. This freezing inhibits the growth of insect eggs. In addition, the multi-pass crushing machine may itself optionally be placed in an air-conditioned room. Moreover, the cyclone and processing bin may optionally be enclosed in a building structure to keep heat off it as well, or elevated to provide cooling air thereunder. All of these approaches keep the grain cool and reduce the potential for contaminants to grow in the grain (both during and after processing). Reducing the potential for contaminant growth advantageously reduces the need for preservatives and keeps the product safe for human consumption.

In further aspects, the present invention includes a system for crushing and processing grain without destroying germ pouches in the grain comprising: (a) a first pneumatic system for transporting grain from a truck in a receiving area into a cyclone and processing bin; (b) a second pneumatic system for transporting the grain from the processing bin into a second cyclone and pre-crushing area; (c) two airlock systems on the second cyclone and pre-crushing area for reducing air pressures in the pre-crushing area; and (d) a single-pass crushing machine positioned below the pre-crushing area. The single-pass crushing machine comprises three or more roller pairs having intermeshed teeth, wherein each of the roller pairs have a different teeth geometries between their intermeshed teeth, and wherein each of the roller pairs turn at different speeds as grain passes downwardly through the single-pass crushing machine from one roller pair to the next. In preferred aspects, the teeth on the rollers have rounded edges and no spacing or valley between the teeth.

In preferred aspects, the present single-pass crushing machine is distinct from the multi-pass crushing machines and crushing scenarios described in the Bihn '408 patent. For example, in preferred embodiments, the present single-pass crushing machine may have three or more pairs of rollers. The roller pairs are preferably secured in the crushing machine using inserts or housings holding self-aligning bearings, which hold the roller shaft in place on center, thereby allowing the rollers to operate at high speeds and with precision, preserving the germ pouch during the crushing process. Each roller in the roller pair preferably has its own insert or housing. The successive roller pairs in the crushing machine effectively have different separation of distances between the intermeshed teeth by changing of the size and angle of the teeth on the rollers. As such, the circumference of the rollers preferably remains the same in each machine and with the spacing between the centers of the rollers also remaining the same in each machine. In accordance with the present system, the teeth are effectively spaced closer together from one roller pair to the next by changing the angles and the sizes of the teeth. As a result, the grain is crushed smaller and smaller when moving downwardly from one successive roller pair to the next in the machine. This advantageously results in the higher production of smaller particle sizes which can then be utilized for the more commercially desirable product of more nutritious starch. In addition, the rotational speeds of each of the roller pairs may be different with roller pairs that have smaller separation distances (due to different teeth geometries) having faster rotational speeds. In addition, the teeth on the rollers preferably have rounded edges, with no space or valley between the teeth. This novel design of the teeth prevents expanding of the grain during the crushing process, which in turn allows the machine to better pull the starch out during the crushing process while preserving the germ pouch resulting in higher levels of protein concentrate. In addition, the roller pairs in the present system are preferably designed to have a length and diameter optimally designed so that the rollers do not sag in the middle. For example, the rollers may be 3 inches long and have a 6 inch diameter, or have other optimal proportions to prevent sagging in the middle of the rollers. The advantage of this optimal proportion design is that the spacing between the rollers in each of the roller pairs remains constant along their length. This results in grains that are crushed to the particular desired dimensions that are defined by the spacing of the teeth and teeth geometries between the rollers. The avoidance of rollers sagging in the middle of the roller pair results in the size of grains consistent along the length of the rollers.

DETAILED DESCRIPTION OF THE FIGURES

Figure 1:
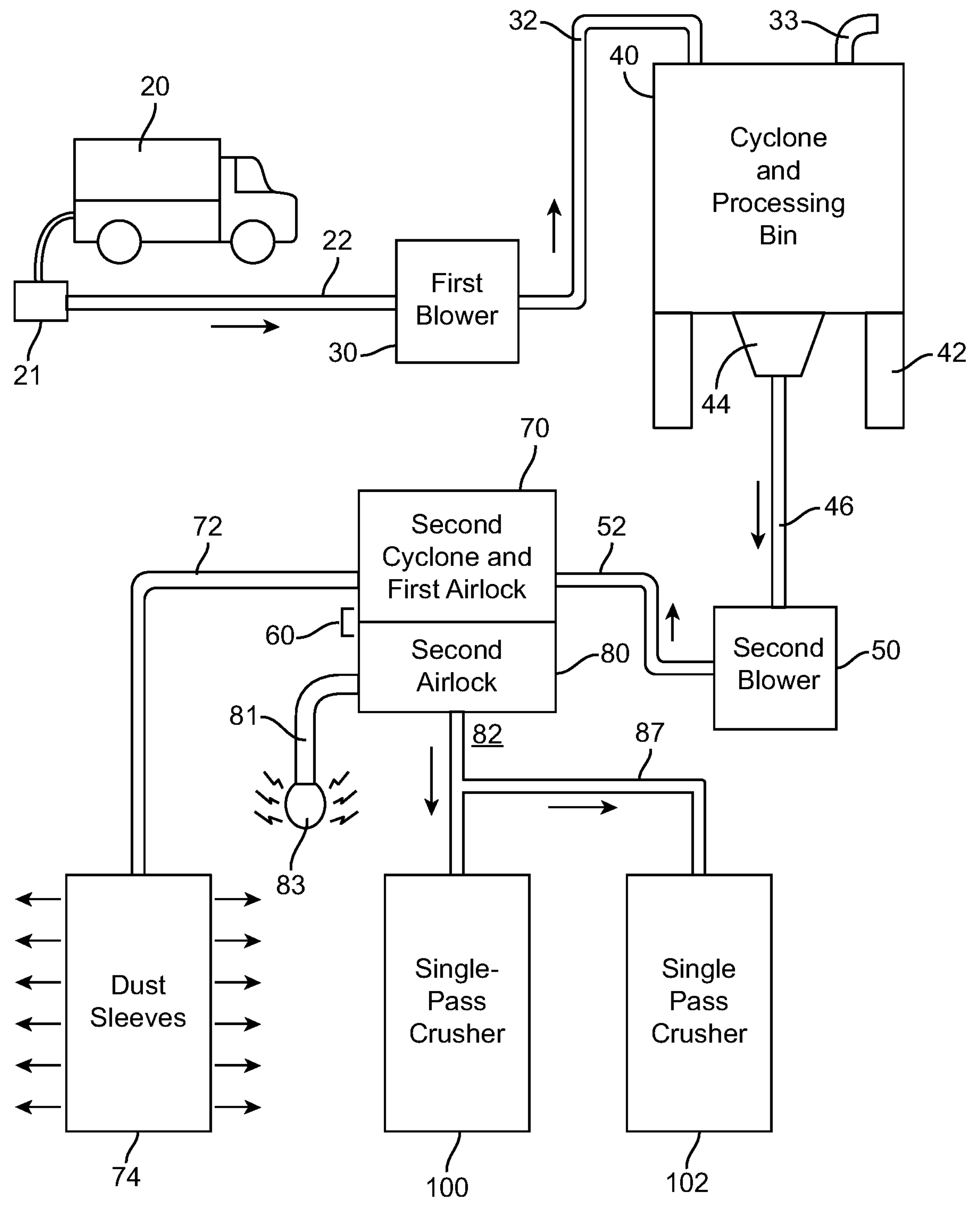
FIG. 1 is a schematic representation of the present system.

Referring first to FIG. 1, a schematic showing overall operation of the present system is provided. System 10 is operated to perform a method of crushing and processing grain without destroying germ pouches in the grain, as follows.

First, the grain is pneumatically transported from a truck 20 to a cyclone and processing bin 40. This may optionally be accomplished by using a suction air blowing system as a first air blower 30 (for example, a granular transport air suction and blowing system such as a Kongskilde™ SUC 200 Suction Blowing System made by Kongskilde Industries of Soro, Denmark. In such a system, grain is unloaded from the truck 20 into a collecting area (e.g.: a hopper) 21 at the back of the truck.

Figure 2:
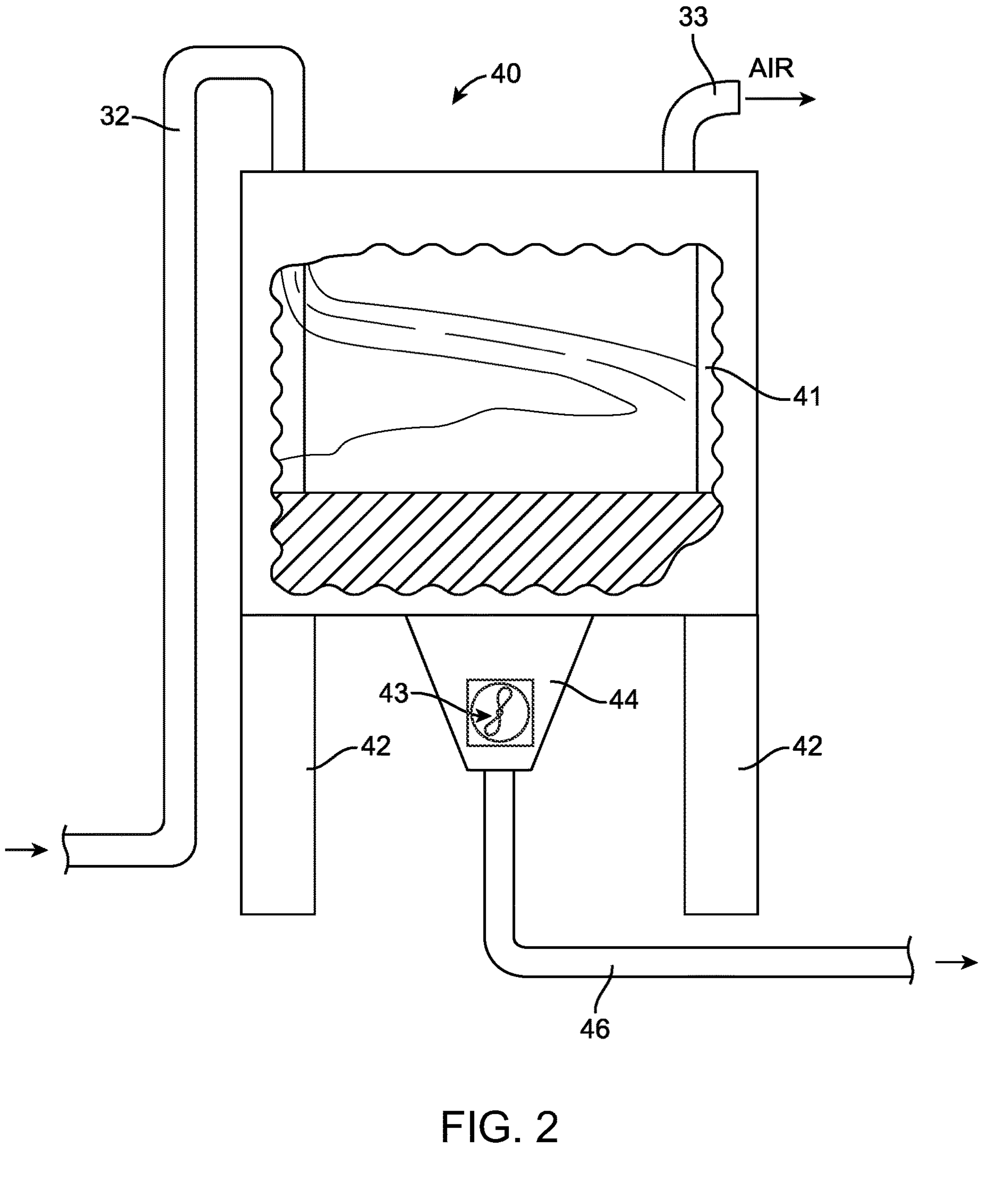
FIG. 2 is a close-up cut away view of a preferred processing bin.

Next, as seen in FIGS. 1 and 2, the first air blower 30 sucks air and grain through pipe 22, and blows the air and grain down through pipe 32 such that the grain enters the top or side of a temperature and moisture controlled cyclone and processing bin 40. Processing bin 40 is preferably itself housed in a temperature and moisture controlled room or setting. In preferred aspects seen in FIG. 2, the grain is blown into a cyclone top with the grain swirling around several times before dropping onto the pile of grain in the bin. For example, the grain may swirl 2 to 3 times around before descending onto the pile of grain already in the bin. This is preferably done while permitting air to escape from the top of bin 40 through exit 33.

Figure 3:
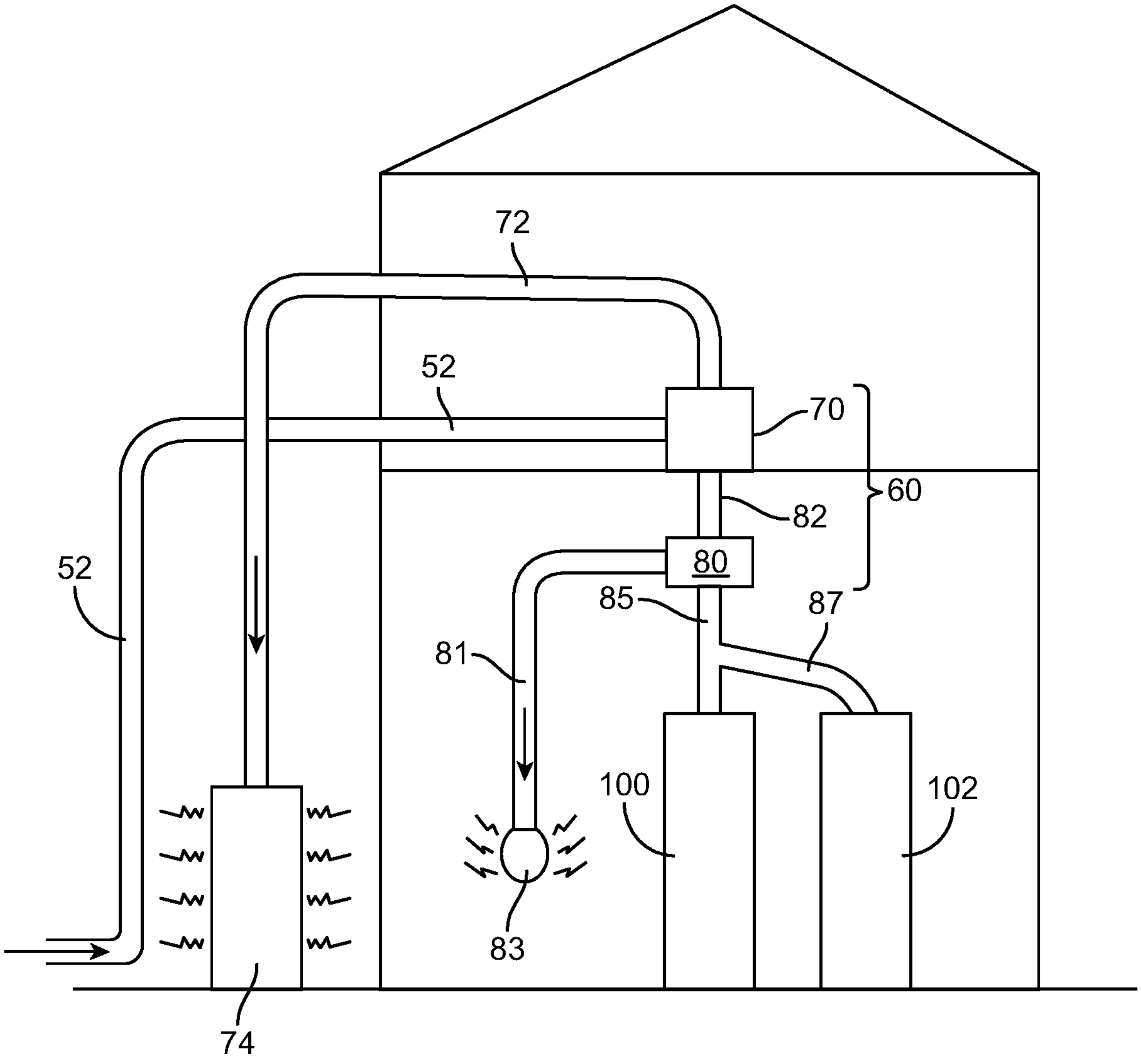
FIG. 3 is an illustration showing placement of the present first and second air interlocks in a building attic above the present crushing machine. An optional second crushing machine is also shown.

Cyclone and processing bin 40 is shown in cut-away in FIG. 2 to illustrate the grains being blown out of pipe 32 and falling down into the cyclone and then down into the bin after cycloning or swirling around first. Insulated walls 41 are seen in this cutaway view. A 12-14 inch diameter fan system 43 blows air into the bottom of processing bin 40, with a vent 33 letting air out of the top. The advantage of this fan and vent system is that the interior of the cone of processing bin 40 can be kept moisture controlled. The advantage of having processing bin 40 insulated and temperature controlled is that it keeps the grain therein cool which discourages the infestation of insects and other pests and controls the moisture and prevents overheating of the germ pouch. As also seen in FIGS. 1 and 3, insulated cyclone and processing bin 40 preferably has legs 42 that support it above the ground. As such, air circulating underneath processing bin 40 further keeps the grain in processing bin 40 cool.

In the next stage of the process seen in FIGS. 1 and 3, the grain is pneumatically moved from the cyclone and processing bin 40 to a pre-crushing area 60. As understood herein, pre-crushing area 60 may include areas in an attic or other room or area of a building (as illustrated in FIG. 3) or below the attic in the room in which the single pass crusher 100 is housed, or both. In preferred aspects, the grain is transported from the cyclone and processing bin 40 to pre-crushing area 60 by a secondary air suction and blowing system 50. In preferred aspects, the secondary air blower 50 may be similar in design to the first air blower 30. As such, as seen in FIGS. 1 and 2, the grain may be drawn down into funnel 44, and then sucked though pipe 46, pass through second air blower 50 and then be blown through pipe 52 into a second cyclone at the first airlock 70, thereby passing eventually up into pre-crushing area 60. It is to be understood, however, that alternative pneumatic transportation systems may also be used for second blower 50. Preferably, pipe 52 turns and enters the building at an elevated location (i.e.: into the attic pre-crushing area 60) of the building as seen in FIG. 3. As also seen in FIGS. 1 and 3, a second single-pass crusher 102 can be used simultaneously with single pass crusher 100. It is to be understood that more than two single-pass crushing machines can be used as well, all keeping within the scope of the present invention.

In the next stage in the process, the grain is dropped from the pre-crushing area 60 down into a single pass crushing machine 100 while air is simultaneously released from pre-crushing area 60. This air release significantly drops the air pressure in pre-crushing area 60 which has the beneficial effect of not forcing (i.e.: blowing) the grains down into the top of the multi-stage crusher 100. The present inventor has experimentally validated the present system which simultaneously uses two different systems for decreasing the air pressure in pre-crushing area 60, as follows. First, the air received from pipe 52 is separated from the grain and is passed out through a second cyclone at first airlock 70 where the grain is swirled in a different direction. Cyclone and airlock 70 is preferably just a flow cylinder in which mixed air and grain enters at its side through pipe 52. As the air and grain fall into airlock 70 from the second cyclone, a portion of the air is bled off and exits through pipe 72 out of the cyclone (which is preferably at the top of airlock 70), while grain falls out the bottom center of airlock 70 and into second airlock 80. Some of the remaining air pressure in second airlock 80 is then allowed to exit through pipe 81 and dust sleeve 83. As such, releasing air from the first airlock 70 into the dust sleeves 74 decreases the air pressure in the second cyclone and pre-crushing area 60 by a first amount and wherein simultaneously releasing air from the second airlock 80 (through pipe 81) further decreases the air pressure in the pre-crushing area 60 by a second amount.

Figure 4:
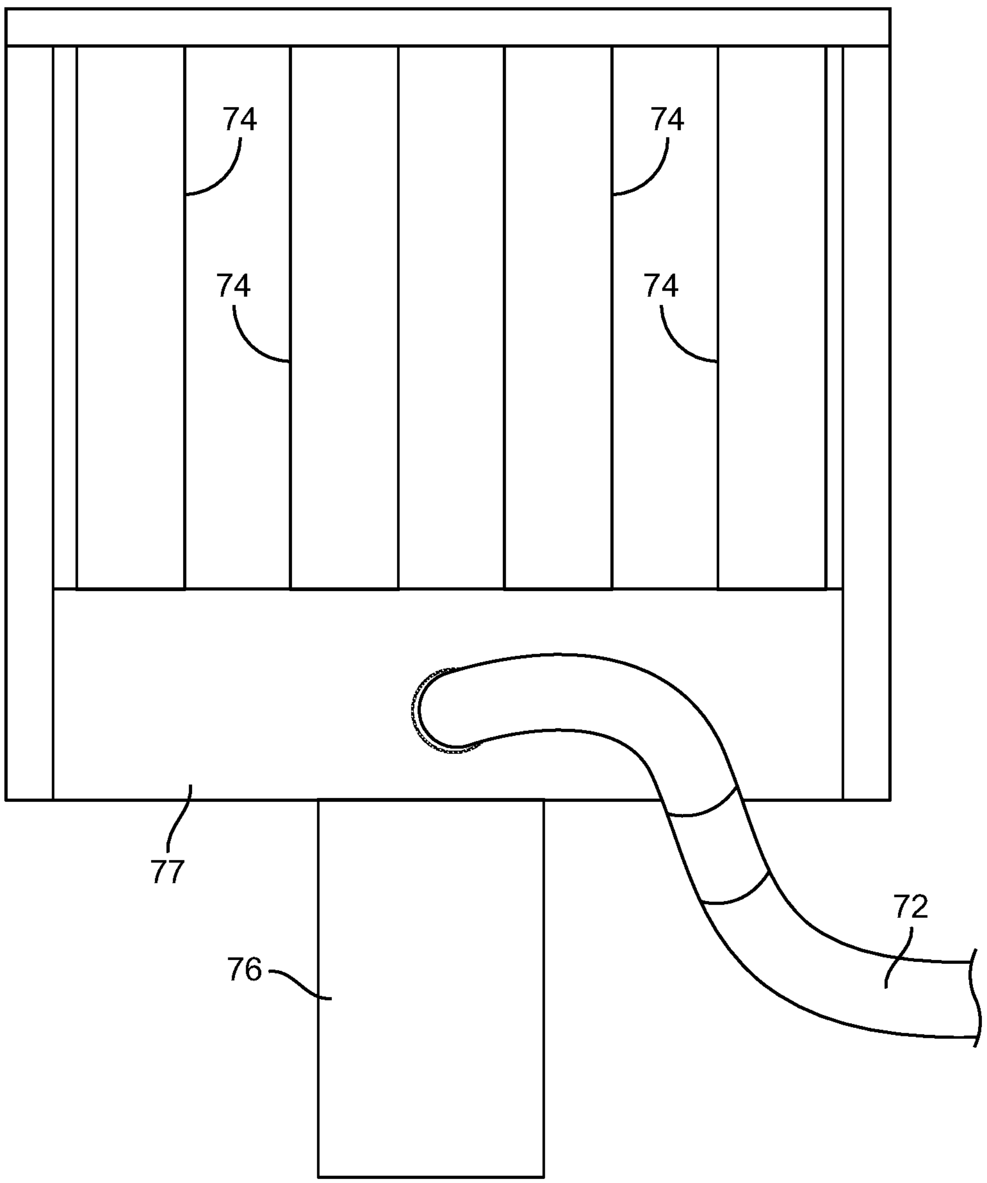
FIG. 4 is a close-up view of the present dust sleeves.

After the air leaves the second cyclone and airlock 70 through pipe 72, it is directed into dust sleeves 74. Specifically, pipe 72 is seen exiting the attic and proceeding down the side of the building towards dust sleeves 74 (which are large and preferably outside the building). As seen in more detail in FIG. 4, air permeates outwardly through the dust sleeves 74 while dust entering the dust sleeves is trapped therein. Specifically, dust sleeves 74 have pores therein such that when air passes into the sleeves, dust is collected by the sleeves with the air passing there through. Dust sleeves 74 are preferably connected to a manifold 77 which rests on stand 76. The advantages of the dust sleeves 74 include the fact that they clean the air as it leaves the present system (as seen in FIG. 1). Cleaning the air as it leaves the present system advantageously permits the present pneumatic systems (blowers 30 and 50) to be used to transport the grain in bulk quantities without generating excessive dust pollution. Importantly as well, existing grain transportation systems typically have to moisten the grain to combat dust. In contrast, the present system removes dust without having to moisten the grain at all. Keeping the grain dry inhibits the infestation of insects or contamination. As such, the present system does not need to rely on preservatives at all which is distinct from other transportation systems which must rely on preservatives. Importantly as well, the use of dust sleeves 74 also lowers the air pressures in pre-crushing area 60.

As seen in FIG. 3, after passing down through the first airlock 70 in the attic, the grain falls down through a pipe 82 into the second airlock 80. In accordance with various aspects of the present system, however, a second airlock 80 described above is used to further decrease the air pressure in pre-crushing area 60. Airlock 80 may preferably be located in the same room as multi-stage crusher 100 directly below airlock 70. As such, the grain falls down through pipe 85 into the single-pass crusher 100. Working together, airlocks 70 and 80 drop the air pressure enough in pre-crushing area 60 that the grain therein simply falls down into single-pass crusher 100 (rather than being blown down by the force of the air movement caused by either or both of air blowers 30 and 50).

Optionally as well, a second single-pass crushing machine 102 can be installed in the same room as the first single-pass crushing machine 100. In this setup, pipe 87 feeds grain into the second single-pass crushing machine 102 (after the grain has passed through the above-described system). It is to be understood, however, that any number of single-pass crushing machines can be operated in parallel using the same illustrated system of pneumatically transporting grains from a truck into the crushing machines, all keeping within the scope of the present system.

Figure 5:
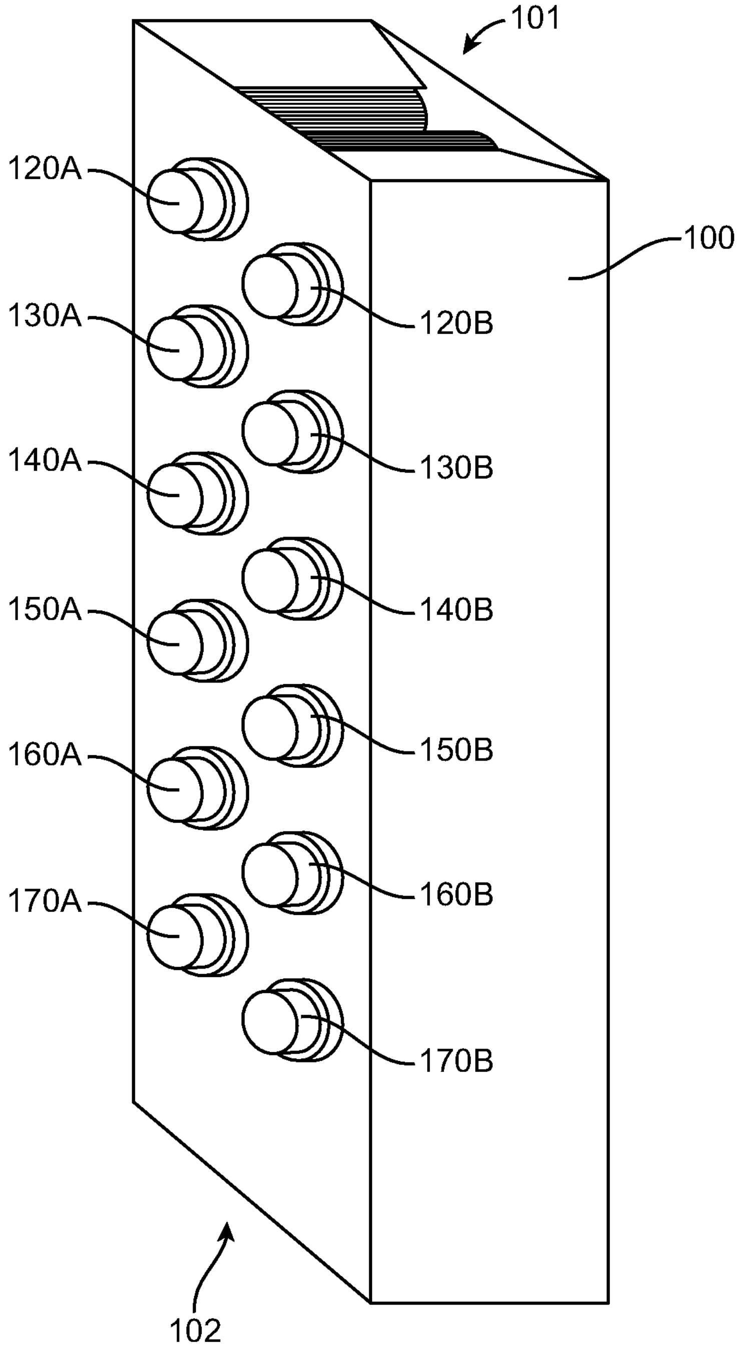
FIG. 5 is an illustration of the present single-pass crushing machine.

Finally, the grain is crushed in the single-pass crushing machine 100 (and optionally 102). The differences between the grain crushers described in the above Bihn patents and the present grain crusher 100 and the differences between the rollers is described above, and further details of the single-pass crushing machine 100 are seen in FIGS. 5 and 6.

Figure 6:
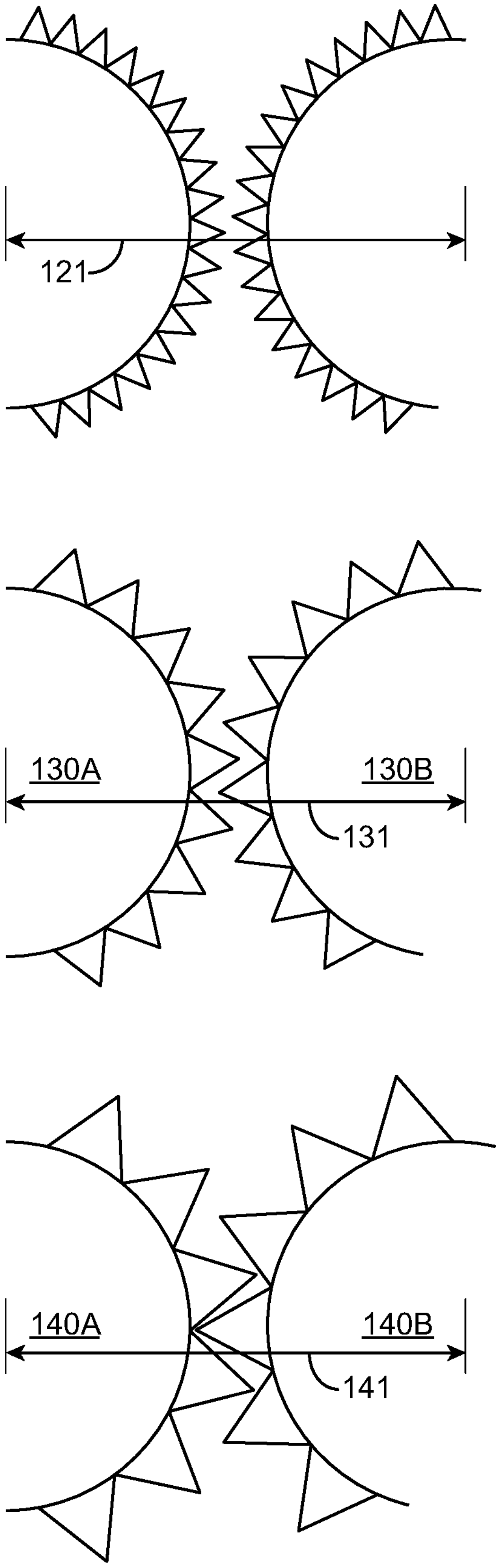
FIG. 6 is a schematic illustration showing the positioning of three of the six pairs of rollers with the spacings between the roller pairs progressively decreasing as grain moves downwards through the machine.

As seen in FIG. 6, three of the present six roller pairs are identified as 120 (rollers 120A and 120B), 130 (rollers 130A and 130B) and 140 (rollers 140A and 140B) are illustrated. (Roller pairs 150 to 170 continue below, but are not illustrated). Grain enters at the top 101 and exits through the bottom 102 of the crushing machine. The grain requires only one single pass through the machine from top to bottom. At each stage, the grain passes between successive roller pairs. In the illustrated system, there are six pairs of rollers (120, 103, 140, 150, 160 and 170). It is to be understood that the present system is not limited to only six pairs of rollers. Rather, the present invention preferably encompasses three or more pairs of rollers, more preferably four to six pairs of rollers, and optionally six to ten pairs of rollers.

As seen in the close-up view of FIG. 6, only roller pairs 120 to 140 are illustrated. Each of the roller pairs 120, 130 and 140 have identical circumferences and have identical central axis to central axis separation distances 121, 131 and 141. (Note: the separation distances between roller pairs 150, 160 and 170 is the same but is not illustrated in the close-up view of FIG. 6). Importantly, however, the size of the teeth and their angles effectively crushes the grain finer and finer as the grain moves downwards from one successive roller pair to the next. As grain falls down though single-pass crushing machine 100, it is progressively crushed to smaller and smaller sizes (until the desired grain size is finally reached) simply due to the size and shape of the teeth on each roller pair, despite the same distance between rollers and same size of circumference of rollers. Specifically, the angle and size of teeth progressively cause the grain to be crushed smaller and smaller. Note: the illustration of teeth size and shape in FIG. 6 need not be to scale. It may be exaggerated somewhat for ease of illustration and understanding. It is also to be understood that different grains will be crushed down to different sizes. As such, different numbers of roller pairs and different sizes of pairs and teeth may be used for crushing different types of grain, all keeping within the scope of the present system.

Most preferably, the present single pass crushing machine has 3, 4 to 6 or 6 to 10 pairs of rollers, and these roller separation distances are not adjustable or do not require adjustments after the single pass machine 100 has been manufactured. In preferred embodiments, the rotational speeds of each of the roller pairs are different, and the roller pairs that have smaller separation distances between the intermeshed teeth have faster rotational speeds.

Figure 7A:
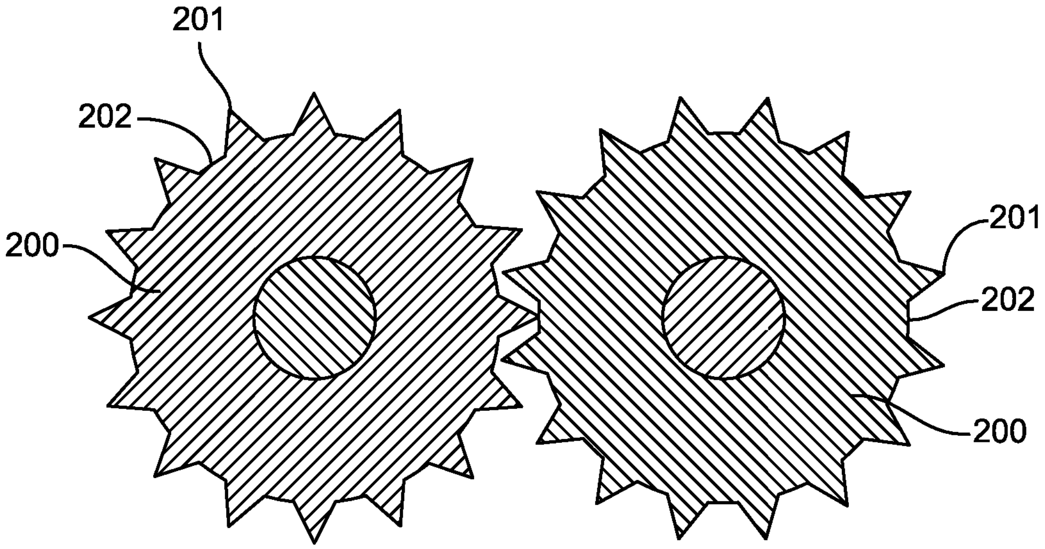
FIG. 7A (PRIOR ART)
FIG. 7A is a sectional view through one of the rollers of the Bihn '408 and '783 patents.
Figure 7B:
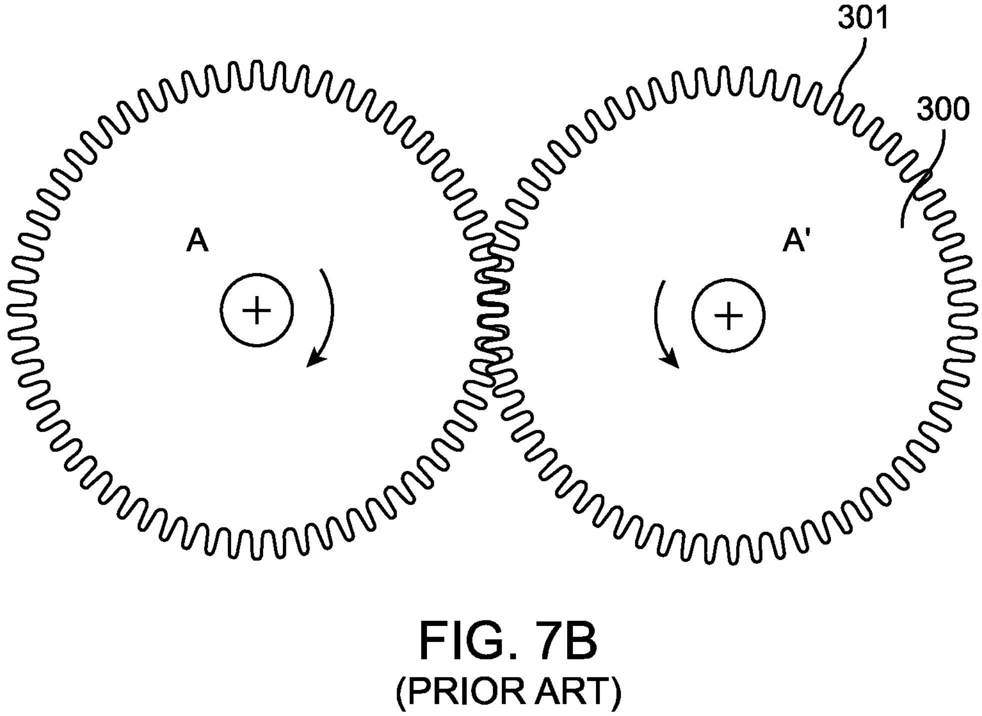
FIG. 7B (PRIOR ART)
FIG. 7B is a sectional view through one of the rollers of Patent Application 2009/0294558 also to John Bihn.
Figure 7C:
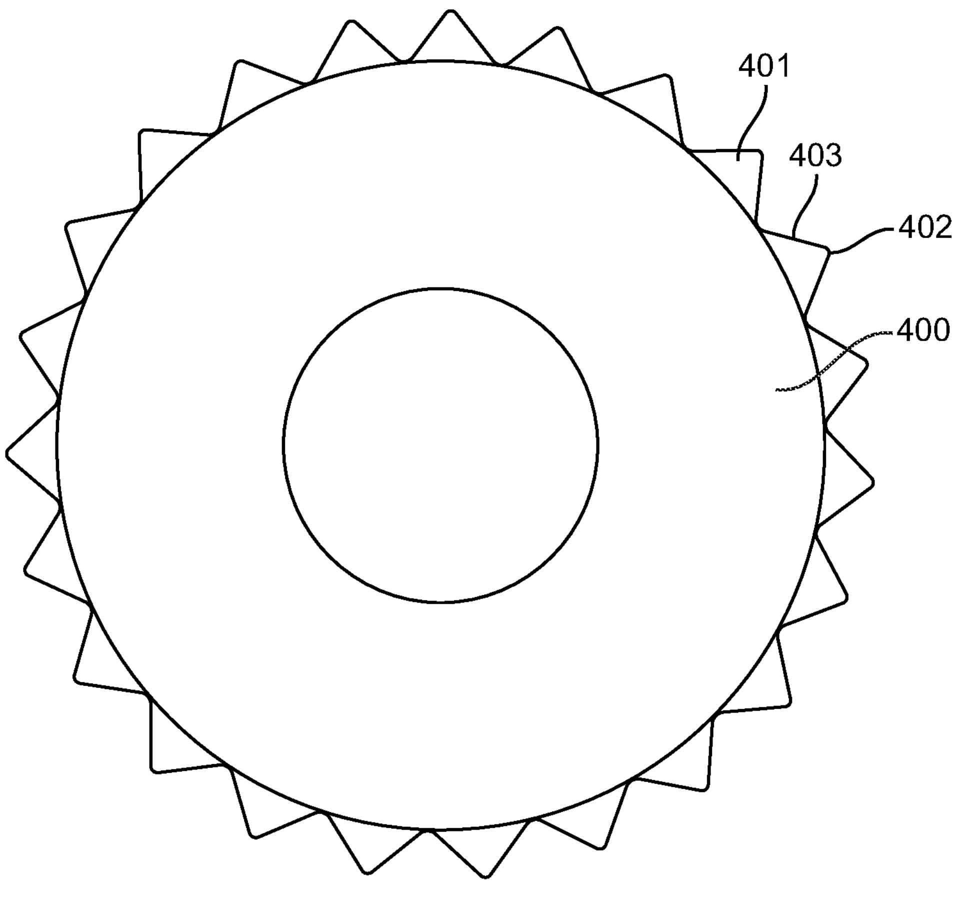
FIG. 7C is a sectional view through one of the rollers of the present invention, illustrating the Applicant's novel teeth design.

Next, FIGS. 7A to 7C show sectional views through various roller pairs showing the present inventor's novel teeth design. First, FIG. 7A is a sectional view through one of the rollers of the Bihn '408 and '783 patents. As can be seen, its rollers 200 each have sharp teeth 201 with large flattened valleys 202 there between. At this time, it was believed that the large valleys 202 ensured no metal-to-metal contact between the rollers of the roller pair and that the grains could successfully be crushed between the individual teeth 201 and valleys 202 without damaging the germ pouches of the grains. The tooth design of FIG. 7A followed the earlier tooth design in FIG. 7B which is a sectional view through one of the rollers of Patent Application 2009/0294558 also to John Bihn. In FIG. 7B, the rollers 300 simply had standard interlocking teeth 301. This design also suffered from the disadvantage of damaging the germ pouches of the grains. Moreover, the valleys had too much grain get in between the teeth causing the grain to expand. In contrast, the present design of the teeth and rollers prevents expanding of the grain during the crushing process, which in turn allows the machine to better pull the starch out during the crushing process while preserving the germ pouch resulting in higher levels of protein concentrate.

Through considerable experimentation and testing, the present inventor developed the novel tooth and roller design of FIG. 7C in which each of the successive teeth 401 have a rounded top edge 402 and straight edges 403 and no valleys or spaces between the teeth. This particular design has been determined to be very suitable when crushing grains as it prevents destruction of the grains' germ pouches and, as described above, allows the machine to better pull the starch out during the crushing process.

Figure 8:
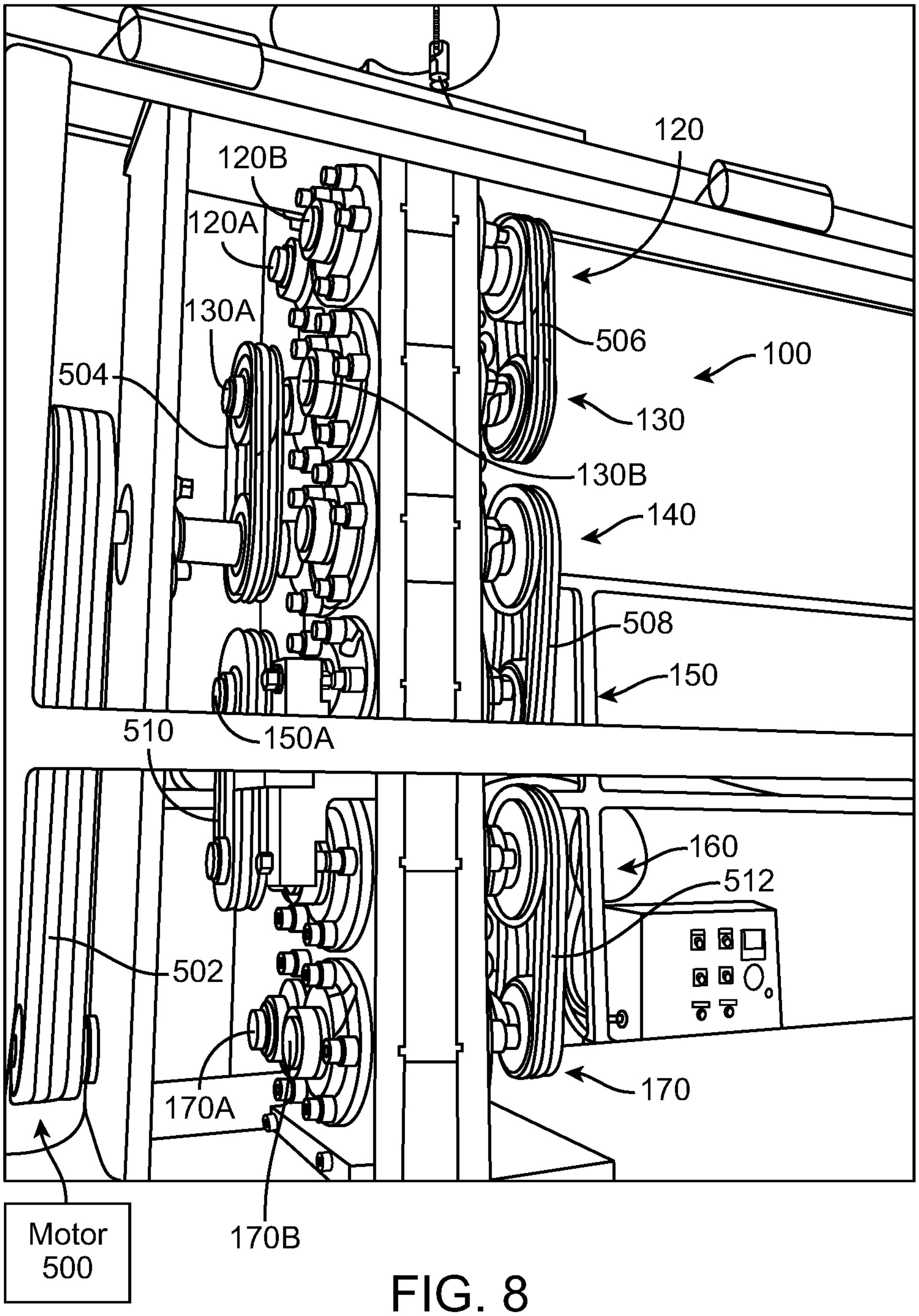
FIG. 8 is a perspective view of the present single-pass crushing machine.

FIG. 8 shows a perspective view of the present single-pass crushing machine 100. Roller pairs 120, 130, 140, 150, 160 and 170 can be seen. A motor 500 drives a belt 502 which turns one roller of each of roller pairs 140 and 130 (through belt 504). Rotating one of the rollers of roller pair 140 causes the other roller of roller pair 140 to turn. Similarly, rotating one of the rollers of roller pair 130 causes the other roller of roller pair 130 to turn. Belt 506 causes roller pair 120 to rotate and belt 508 causes roller pair 150 to rotate. Belts 510 and 512 similarly cause roller pairs 160 and 170 to rotate. Grain enters at the top of machine 100 at the top and after passing sequentially through roller pairs 120, 130, 140, 150, 160 and 170, the finely ground grain exits the bottom of the machine.

Figure 9A:
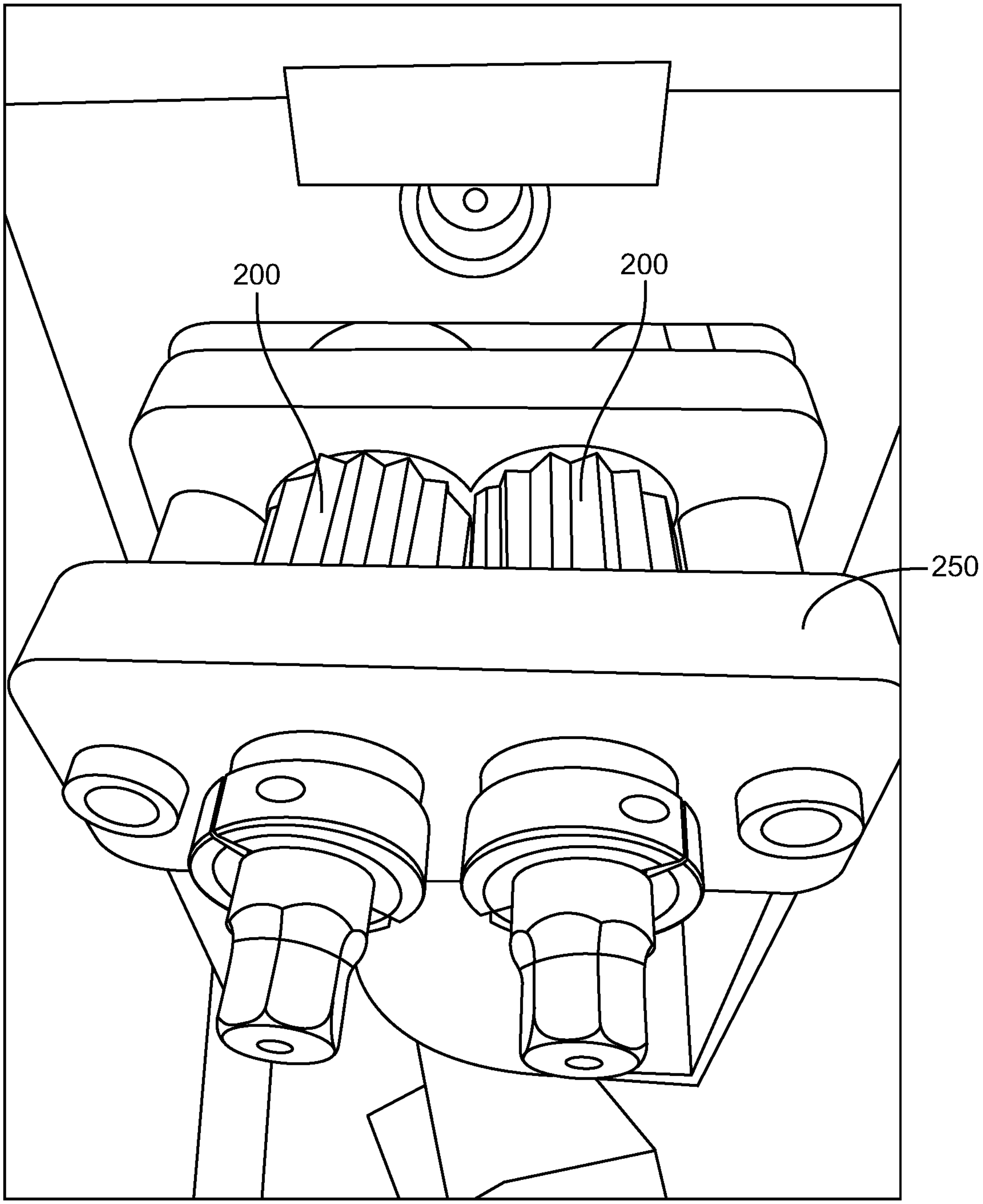
FIG. 9A (PRIOR ART)
FIG. 9A is a perspective view of the "locator block" system for positioning the rollers as described in the Bihn '408 and '783 patents.
Figure 9B:
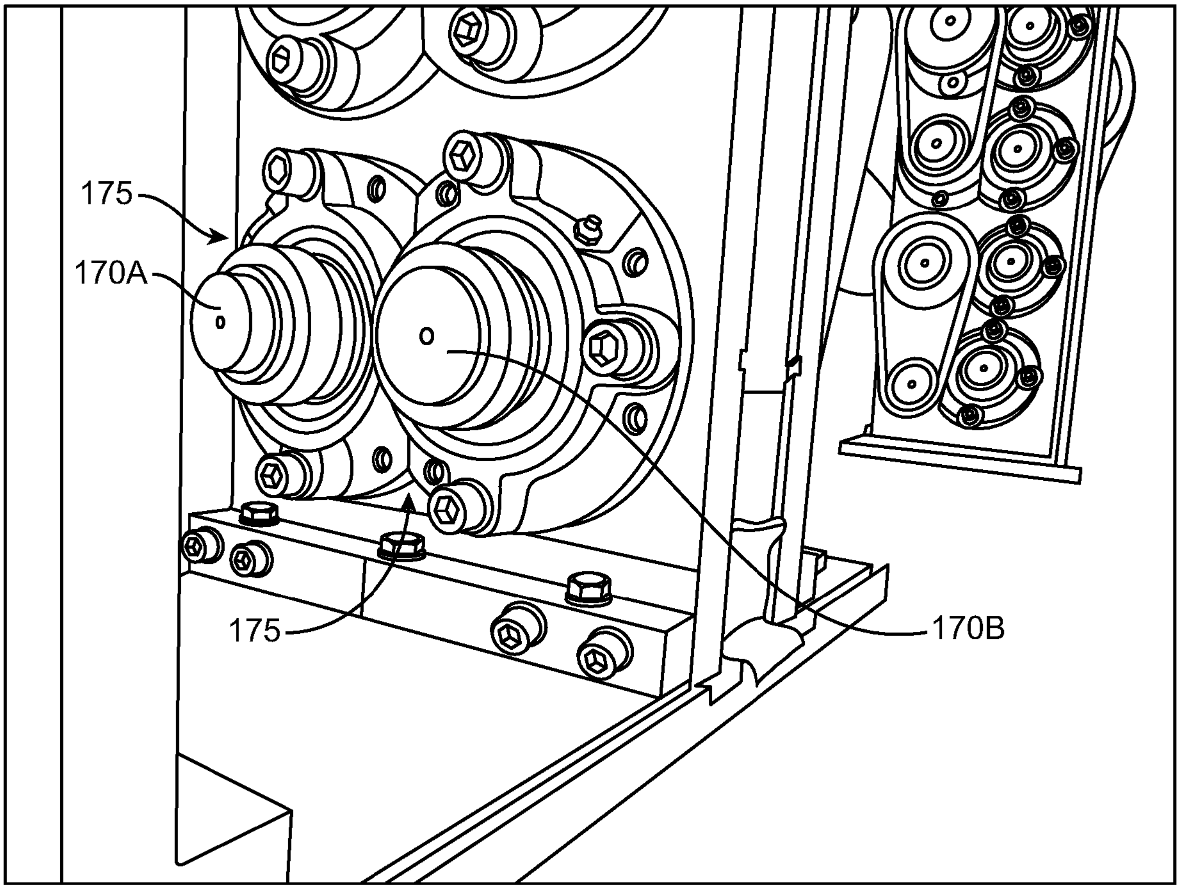
FIG. 9B is a perspective view of the present self-aligning bearings system for positioning the rollers.

Lastly, FIGS. 9A and 9B compare the prior art "locator blocks" positioning system as seen in Bihn '783 patent (FIG. 9A) to the present system which does not use "locator blocks" (FIG. 9B). In FIG. 9A, a single large locator block 250 is used to hold both rollers 200. In contrast, in the present system seen in FIG. 9B, each roller (e.g.: 170A and 170B) is held in position by a self-aligning bearing 175.

It is to be understood that the specification and drawings describe and illustrate exemplary embodiments of the invention and that the present claims are to be interpreted to encompasses modifications and equivalents known to persons skilled in the art.

What is claimed is:

1. A method of crushing and processing grain without destroying germ pouches in the grain comprising:

(a) pneumatically transporting grain from a truck in a receiving area to a cyclone and processing bin;

(b) pneumatically transporting the grain from the cyclone and processing bin to a pre-crushing area;

(c) dropping the grain from the pre-crushing area down into a single pass crushing machine while simultaneously releasing air from the pre-crushing area thereby dropping air pressure in the pre-crushing area such that the grain falls from the pre-crushing area into the single-pass crushing machine under the force of gravity and is not blown down into the single-pass crushing machine; and then (d) crushing the grain in the single-pass crushing machine, wherein the single-pass crushing machine comprises three or more roller pairs having intermeshed teeth, wherein each of the roller pairs have a differently shaped intermeshed teeth, and wherein the grain falls downwardly in the crushing machine from one roller pair to the next.

2. The method of claim 1, further comprising:

(e) passing air from a cyclone of the pre-crushing area to a series of dust sleeves having pores therein such that air received into the dust sleeves escapes through the pores, but dust received into the dust sleeves is trapped in the dust sleeves and is not released to the atmosphere.

3. The method of claim 2, further comprising releasing air from the cyclone of the pre-crushing area, wherein the release of air comprises releasing air through a first airlock and releasing air through a second airlock, and wherein the air passing from the pre-crushing area into the series of dust sleeves passes through the first or second airlock.

4. The method of claim 1, further comprising:

(e) controlling temperature and moisture of the grain in the processing bin by at least one of:

insulating the processing bin, passing air into the processing bin with a fan, enclosing the processing bin in an air conditioned environment, enclosing the processing bin in a dehumidified environment, or enclosing the processing bin in a sun-shielding building structure.

5. The method of claim 1, wherein the pneumatic transportation of grain from the truck into the receiving area to the processing bin comprises blowing grain into a side of the cyclone and processing bin causing the grain to swirl inside the cyclone preserving the germ pouch and falling into the processing bin while releasing air from a top of the cyclone and processing bin.

6. The method of claim 1, further comprising placing the single-pass crushing machine in a temperature controlled room.

7. The method of claim 1, further comprising:

(e) crushing the grain in a second single-pass crushing machine, wherein the grain passes from the pre-crushing area by falling down into both the single-pass crushing machine and the second single-pass crushing machine.

8. The method of claim 1, wherein the rollers on the single-pass crushing machine have teeth with rounded edges.

9. The method of claim 1, wherein the single-pass crushing machine has 3 to 10 roller pairs.

10. The method of claim 1, further comprising:

freezing the grain after the grain has exited the single pass crushing machine.

11. A system for crushing and processing grain without destroying germ pouches in the grain comprising:

(a) a first pneumatic system for transporting grain from a truck in a receiving area into a cyclone and processing bin;

(b) a second pneumatic system for transporting the grain from the cyclone and processing bin into a pre-crushing area;

(c) a second cyclone and an airlock system in the pre-crushing area for reducing air pressures in the pre-crushing area; and (d) a single-pass crushing machine positioned below the pre-crushing area, wherein the single-pass crushing machine comprises three or more roller pairs having intermeshed teeth, wherein the grain falls downwardly in the crushing machine from one roller pair to the next.

12. The system of claim 11, wherein the processing bin is temperature and moisture controlled.

13. The system of claim 1, further comprising:

(e) a series of dust sleeves connected to the airlock system, and wherein the dust sleeves have pores therein such that air received into the dust sleeves escapes through the pores, but dust received into the dust sleeves is trapped in the dust sleeves and not released to the atmosphere.

14. The system of claim 13, wherein the airlock system comprises a first airlock and a second airlock, and wherein the series of duct sleeves are connected to the first or second airlock.

15. The system of claim 11, wherein the single-pass crushing machine is positioned directly below the pre-crushing area such that the grain falls down from the pre-crushing area into the single-pass crushing machine.

16. The system of claim 15, wherein the pre-crushing area is in a room or space above a room in which the single-pass crushing machine is positioned.

17. The system of claim 11, wherein the rollers on the single-pass crushing machine have teeth with rounded edges.

18. The system of claim 11, wherein the rollers in each roller pair are secured in the crushing machine using inserts or housings with self-aligning bearings that hold a roller shaft of each roller in place on center.

19. The system of claim 11, wherein the single-pass crushing machine has three pairs of rollers.

20. The system of claim 11, wherein the single-pass crushing machine has 4 to 6 roller pairs.

21. The system of claim 11, wherein the single-pass crushing machine has 6 to 10 roller pairs.

* * * * *